Nov. 8, 1966 T. J. HARRISON ETAL 3,284,646

FILTER CIRCUIT

Filed March 11, 1963 2 Sheets-Sheet 1

Nov. 8, 1966 T. J. HARRISON ETAL 3,284,646

FILTER CIRCUIT

Filed March 11, 1963 2 Sheets-Sheet 2

INVENTORS.
THOMAS J. HARRISON
JAMES JURSIK

BY [signature]

ATTORNEY 3,284,646
Patented Nov. 8, 1966

3,284,646

FILTER CIRCUIT

Thomas J. Harrison and James Jursik, San Jose, Calif., assignors to International Business Machines Corporation, New York, N.Y., a corporation of New York Filed Mar. 11, 1963, Ser. No. 264,269
3 Claims. (Cl. 307—105)

This invention relates in general to filters and particularly to a sampled low pass filter having a variable characteristic.

The elimination of noise from lines which carry analog signals, and in particular, low level analog signals such as those developed by thermocouples, cannot in some cases be satisfactorily accomplished by a conventional RC filter without sacrificing certain desirable characteristics. For example, attenuation of the commonly encountered 60 cycle power line noise requires a relatively long time constant. In data acquisition systems, in particular as applied to industrial process control, where it is necessary to read a large number of input signals, the speed at which this can be accomplished when a single, time shared, filter is used is dependent upon the time constant of the filter. This is due to the time required for the filter to settle out after being connected to each input signal which is generally considered to be seven time constants. This limitation on the overall system multiplexing rate or input scanning speed can be overcome by the use of a separate filter for each input line, but this is both expensive and wasteful of space.

A form of noise frequently encountered in instrumentation can be attributed to what is known as a common mode voltage or potential. A common mode voltage is a voltage which appears between both lines of an input and a reference point, normally the system ground. This potential may be A.C., D.C. or a combination of A.C. and D.C. in a general case.

Some common mode sources which may be found in an industrial environment include transducer design, electrostatic or inductive pickup, chemical E.M.F., thermoelectric E.M.F., cross talk leakage and differences in ground potentials.

In any physically realizable system a certain fraction of the common mode voltage is converted to a potential that appears between the lines. This potential is indistinguishable from the valid signal across the lines. The line to line potential is referred to as the normal mode voltage. A figure of merit for any given system which expresses the system's capability for rejecting common mode voltage is called the Common Mode Rejection Ratio. It is defined as the ratio of the common mode voltage divided by the normal mode voltage resulting from the common mode voltage. That is:

Common mode rejection ratio (CMR)=

$$\text{(1)}\qquad \frac{\text{Common mode volts}}{\text{Common mode volts converted to normal mode}}$$

A typical value for the common mode rejection ratio of a data amplifier is one million to one at D.C. or 60 cycles A.C. Typical values for data collection systems are often less than this by a factor of two or three because of multiplexing equipment and other input circuitry which tends to degrade system performance.

It is not possible to show the exact mechanism by which common mode voltages are converted to normal mode voltages in every specific system application because the system parameters which determine this are distributed. It is, however, possible to consider certain lumped parameter situations which indicate the nature of the conversion process. Consider the simple D.C. case illustrated in FIG. 1. The normal mode voltage $E_s$ is the signal voltage resulting from the thermocouple T.

The common mode voltage $E_{cm}$ is represented by a battery connected between the source and ground. Examination of the circuit shows that $R_1$ and $R_4$ constitute a simple voltage divider. Similarly, $R_2$ and $R_3$ represent another divider. The normal mode voltage which results from $E_{cm}$ is the difference between the voltage appearing at the junction of $R_1$ and $R_4$ and the voltage at the junction of $R_2$ and $R_3$. This is expressed in the following equation:

$$\text{(2)}\qquad E_{nm}-E_{cm}\left[\frac{R_4}{R_1+R_4}-\frac{R_3}{R_2+R_3}\right]$$

$$\text{(3)}\qquad E_{nm}=E_{cm}\left[\frac{R_2R_4-R_3R_1}{(R_1+R_4)(R_2+R_3)}\right]$$

Thus, from Equation 1:

$$\text{(4)}\qquad \text{CMR}=\frac{E_{cm}}{E_{nm}}=\frac{(R_1+R_4)(R_2+R_3)}{R_2R_4-R_3R_1}$$

Examination of the preceding equations indicates several possibilities for obtaining a high common mode rejection ratio. In practice the two schemes most generally applied are to maintain leakage resistances $R_3$ and $R_4$ as high as possible and series resistances $R_1$ and $R_2$ as low as possible.

The disadvantages that have been discussed are eliminated by the use of a sampling capacitor which is alternately connected to the input signal and a larger filter capacitor. Since no resistance is added in series with the signal to be filtered, the common mode rejection is not impaired. The time constant of the filter is directly related to the frequency at which the sampling capacitor is switched from input to output. This allows the filter time constant to be changed by variation of the sampling frequency during each sampling period. Thus, by reduction of the settling time a single time shared filter may be used for muliple input systems. Conventional techniques would require a separate RC filter for each input.

It is, therefore, an object of our invention to provide an improved low pass filter.

Still another object is to provide a dual mode filter having adjustable characteristics.

A further object is to provide a filter having a variable time constant.

The foregoing and other objects, features and advantages of the invention will be apparent from the following more particular description of a preferred embodiment of the invention, as illustrated in the accompanying drawings.

FIG. 1, discussed previously, is a schematic drawing of a signal line with common mode voltage, series resistance and leakage resistance.

Figure 2:
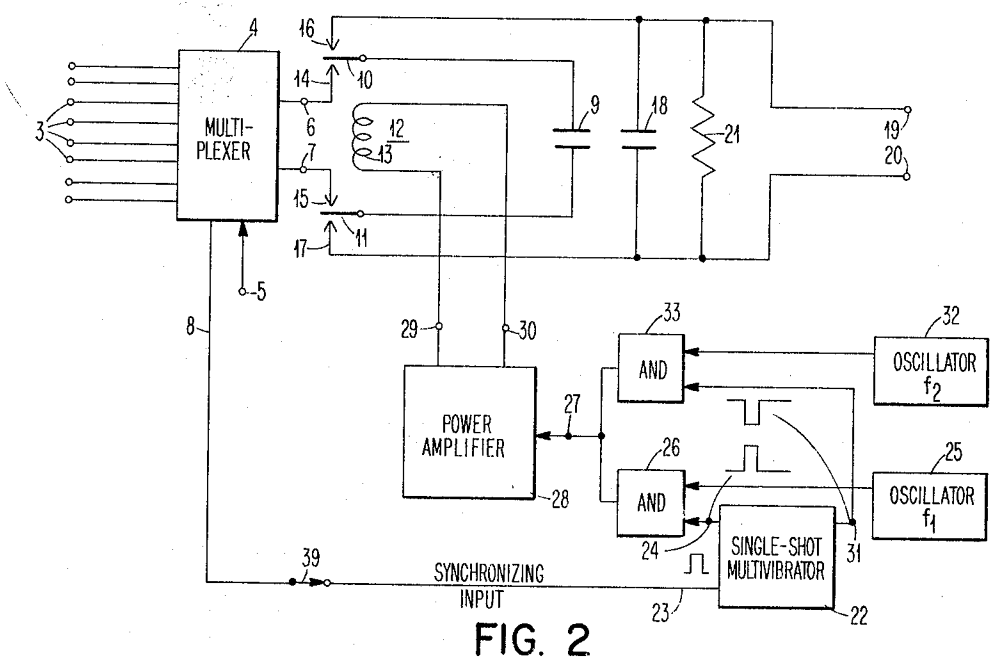
FIG. 2 is a schematic drawing showing the dual mode filter and associated devices.

Considering FIG. 2, a number of low level input signals are connected to input terminals 3 of the multiplexer 4. An address which specifies a particular pair of input terminals 3 is applied to the multiplexer selection input 5. This signal is effective to set up a connection between the selected one of terminals 3 and the output terminals 6 and 7 which also correspond to the input terminals of the dual mode filter. At the time of this connection, multiplexer 4 provides a signal on line 8, the purpose of which will be explained later.

Transfer capacitor 9 is connected to the armatures 10 and 11 of the double pole double throw switch 12. Drive winding 13 is energized with a signal such that the armatures 10 and 11 first make contact with terminals 14 and 15 to charge capacitor 9 to the value of the input signal at the connected one of input terminals 3 and then reverse their direction to make contact with terminals 16 and 17. The capacitor 9, therefore, accepts a charge from the signal source and transfers this charge to the capacitor 18 which is connected to contacts 16 and 17.

The filtered signal appears at output terminals 19 and 20 which are connected in parallel with contacts 16, 17 and capacitor 18. Any practical capacitor of appreciable capacity has some leakage resistance which is shown on the drawing as resistor 21. The leakage of capacitor 9 is quite small and may be ignored in this application.

The switching frequency $f_s$ (in cycles per second) of the drive current supplied to winding 13 is related to the product of the capacity of capacitor 18 and the resistance of resistor 21 in that $$C_{18}R_{21} \gg \frac{1}{2f_s}$$

When the time constant $C_{18}R_{21}$ is much greater than $1/2f_s$, the time constant of the filter is approximately $$\tau = \frac{C_{18}}{C_9 f_s}$$

and the bandwidth at the 3 db point is approximately $1/\tau$ radians per second or $1/2\pi\tau$ cycles per second.

To operate the filter in the dual mode the signal on line 8, which indicates that the connection by multiplexer 4 is complete, operates to trigger the single shot multivibrator 22 at synchronizing input 23. In response to the signal at input 23, multivibrator 22 develops a positive signal level at output terminals 24. The positive level at terminal 24 serves to gate the output of oscillator 25 through AND gate 26 to input terminal 27 of power amplifier 28. The amplifier output of oscillator 25 at a frequency $f_1$ is provided at output terminals 29 and 30 connected to the DPDT switch drive winding 13.

For a period determined by the "on" time of the multivibrator 22, the DPDT switch 12 will operate at a frequency $f_1$. When the single shot multivibrator 22 reverts to the "off" state, output terminal 31 represents the positive signal level and serves to gate the output of oscillator 32 through AND gate 33 to input 27 of power amplifier 28. AND gate 26 is no longer conditioned due to the absence of a positive signal level at output terminal 24.

For the second portion of the multivibrator 22 cycle, the DPDT switch 12 operates at a frequency $f_2$ which corresponds to the output of oscillator 32.

Figure 1:
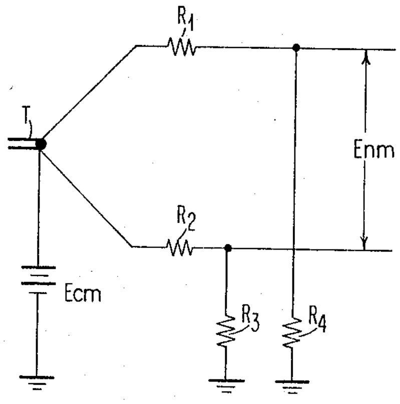
Figure 3:
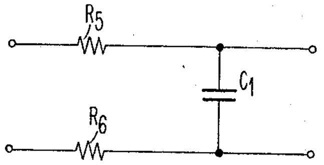
FIG. 3 is a schematic drawing of a conventional balanced RC filter.

Consider now the use of an RC filter as shown in FIG. 3 for a typical application where 60 c.p.s. noise exists with a peak amplitude of 1/10 the direct current signal level, and it is desired to reduce the 60 c.p.s. noise to 1/100 of its unfiltered value (40 db).

The approximate break frequency for the RC filter must be $$f_b = \frac{60}{100} = .6 \text{ c.p.s.}$$

since the attenuation is 20 db per decade. Since $\omega_b = 2\pi f_b$, it follows that $\omega_b = 6.28 \times .6 = 3.77$ radians/sec. $\tau$, the time constant, is then $$\tau = \frac{1}{\omega_b} = .266 \text{ second}$$

At the end of seven time constants the filter output will be sufficiently close to the signal level to permit conversion to a digital value, amplification, or other use. For a typical input of one volt, the filter output at $7\tau$ or 1.86 seconds will be $.999 \pm .001$ volt which is within the range of accuracy desired for this typical application.

Operation of the dual mode filter of our invention is quite different. The frequency $f_1$ initially supplied to the DPDT switch drive winding, is selected to provide a time constant of 1/10 the value of the RC filter in the previous example. This provides a break frequency of 6 c.p.s. and 20 db attenuation of the 60 c.p.s. noise. $\tau$ is .0266 second and seven time constants later, or .1862 second, the output of the filter has risen to $.999 \pm .01$ volt when the input signal is one volt. Note that 60 cycle noise is 20 db above the figure obtained with the .266 second time constant. The DPDT switch frequency is then changed to the value $f_2$ which provides a time constant of .266 second, the same as that of the RC filter to provide the desired 40 db attenuation of 60 cycle noise.

It is necessary to reduce the $\pm .01$ volt error to $\pm .001$ volt which is the desired accuracy. This reduction requires about 2.3 time constants at frequency $f_2$ so that the total time $T_t$ required for the dual mode filter to reach the desired accuracy becomes:

$$T_t = 7 \times .0266 + 2.3 \times .266$$
$$T_t = .796 \text{ second}$$

The time required for the RC filter was 1.86 seconds so that the time improvement in this typical case was greater than two to one.

Figure 4:
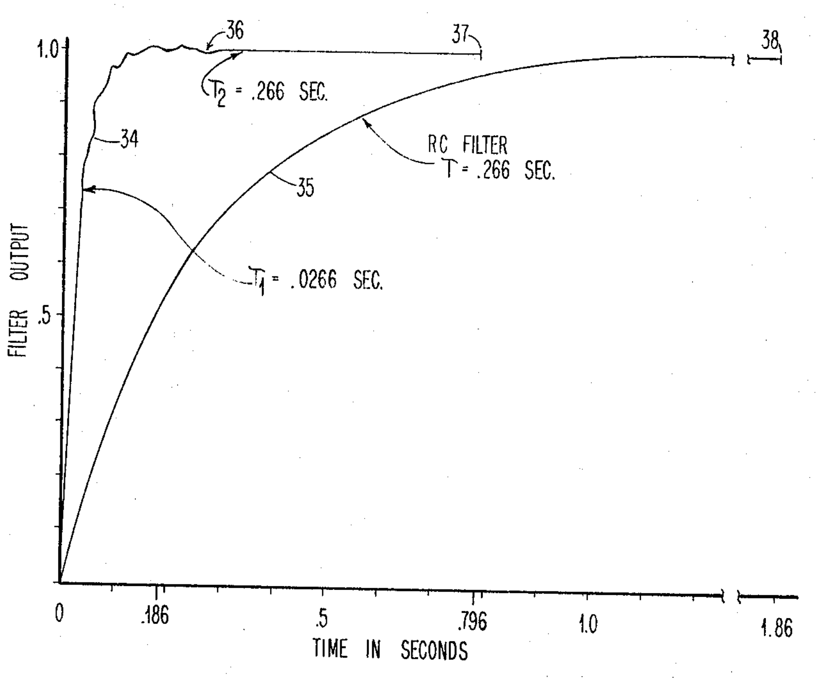
FIG. 4 is a plot of the response of the dual mode filter of FIG. 2 and the RC filter of FIG. 3.

To obtain the dual mode operation the single shot multivibrator 22 would be arranged to provide a .186 second output at terminal 24. The signal could be read .61 second after the output at terminal 31 within the desired accuracy. The graph of FIG. 4 contains a curve 34 representing the response of the dual mode filter and a curve 35 representing the response of an RC filter. The vertical scale represents the filter output voltage and the horizontal scale represents the time after application of the 1 volt signal to the input terminal. The effect of noise on curve 34 is clearly evident during the first .186 second while the filter is operated with a .0266 second time constant. However, subsequent to point 36 where the filter assumes the .266 second time constant, the curve becomes smooth in a manner similar to curve 35.

At point 37, representing .796 second, the dual mode filter is within .001 volt of the input signal. Point 38 on curve 35, representing the equivalent accuracy for the RC filter, occurs at 1.86 seconds after connection.

Typical circuit values yielding time constants as described in the preceding example could be for the RC filter $R_5+R_6=1{,}000$ ohms and $C_1=266$ mfd. and for the dual mode filter $f_1=1600$ c.p.s., $f_2=160$ c.p.s., 10 mfd. for capacitor 18 and .23 mfd. for capacitor 9.

The values of the output signals at 24 and 31 of single shot multivibrator 22 are for the application involving the selected example, and other situations might involve a different ratio. The ratio of the output signals at 24 and 31 may be adjusted to suit the particular result which is desired.

Where it is desired to operate the filter to obtain a very long time constant without degrading the common mode rejection the switch 39 in FIG. 2 is opened. This causes DPDT switch to operate at a constant frequency $f_2$. With this configuration a 40 second time constant can be produced with .01 mfd. for capacitor 9, 160 mfd. for capacitor 18, and a switching frequency $f_2$ of 400 c.p.s.

For a conventional RC filter as shown in FIG. 3, if the total series resistance $R_5+R_6$ is 5,000 ohms, the capacitor $C_1$ must be 8,000 mfd. in order to obtain a 40 second time constant.

Figure 5:
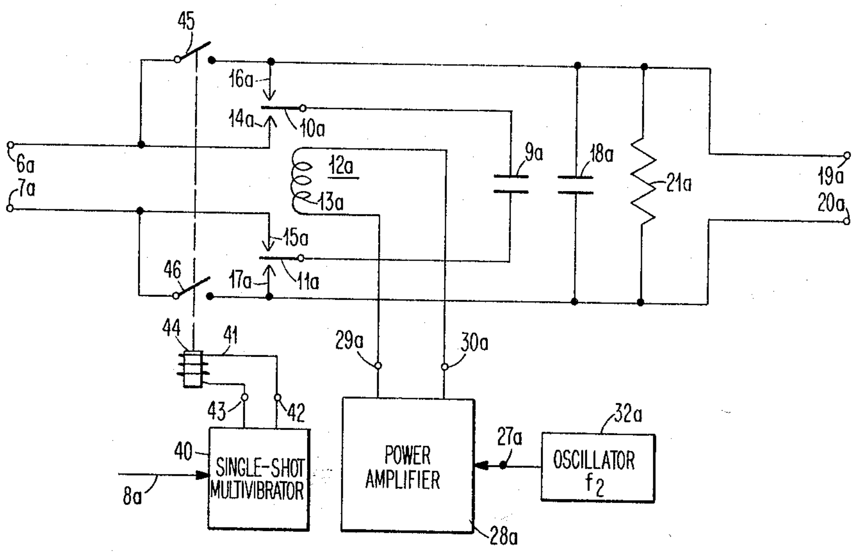
FIG. 5 is a schematic drawing showing a second embodiment of the dual mode filter and associated devices.

The embodiment of FIG. 5 is similar to that of FIG. 2 but the dual mode operation is achieved in a slightly different manner. Elements common to both embodiments are indicated with an appended "*a*" in FIG. 5.

Operation of this filter begins with the connection of terminls 6*a* and 7*a* to the desired of input terminals 3 by means of multiplexer 4. When the connection is complete, multiplexer 4 develops a signal on line 8*a* connected to the input of single shot 40. In response to the input signal on line 8*a*, single shot 40 develops an output current to energize winding 41 connected to terminals 42 and 43. When energized, winding 41 operates relay 44 to close switches 45 and 46 for a time equal to the period of single shot 40.

When operated, switches 45 and 46 connect capacitor 18*a* directly to terminals 6*a* and 7*a* bypassing the DPDT switch 12*a*. Capacitor 18*a* charges to the voltage at terminals 6*a* and 7*a* quite rapidly since the time constant is limited only by the source of impedance and the line resistance.

For a combined source and line resistance of 100 ohms and 10 mfd. value for capacitor 18*a*, the period of single shot 40 would be .007 second for seven RC time constants.

When the output current from single shot 40 cuts off and switches 45 and 46 open, the operation of the filter reverts to the same mode as that of FIG. 2. Oscillator 32*a* supplies a signal at a frequency $f_2$ to input terminal 27*a* of amplifier 28*a*. The amplified output appears at terminals 29*a* and 30*a* connected to drive winding 13*a* of the double pole double throw switch 12*a*.

Armatures 10*a* and 11*a* are alternately connected to contacts 14*a*–16*a* and 15*a*–17*a*, respectively, at a frequency $f_2$.

In this latter mode the device operates to filter noise voltages with the longer time constant as previously described with reference to FIG. 2.

While the invention has been particularly shown and described with reference to preferred embodiments thereof, it will be undestood by those skilled in the art that the foregoing and other changes in form and details may be made therein without departing from the spirit and scope of the invention.

What is claimed is:

1. A dual mode filter compising:
   - a pair of input terminals and a pair of output terminals,
   - first and second capacitor means having the capacitance values $C_1$ and $C_2$, respectively, where $C_2$ is greater than $C_1$,
   - means connecting said second capacitor means between said output terminals,
   - first switch means for connecting said input terminals to said output terminal,
   - second switch means for alternating the connection of said first capacitor means between said input terminals and to said output terminals,
   - means for closing said first switch means for a period of time $t_1$, and
   - means for operating said second switch means at a frequency $f$ during the second period of time $t_2$ subsequent to $t_1$ whereby the 3 db bandwith of said filter during said second period of time approximates $C_1f_1/2\pi C_2$ cycles per second.

2. A dual mode filter comprising:
   - a pair of input terminals and a pair of output terminals,
   - first and second capacitor means having the capacitance values $C_1$ and $C_2$, respectively, where $C_2$ is greater than $C_1$,
   - circuit means connecting said second capacitor means between said output terminals, means for momentarily connecting said input terminals to said output terminals to charge said second capacitor means in response to the voltage across said input terminals,
   - switch means for alternating the connection of said first capacitor means between said input terminals and said output terminals subsequent to initially charging said second capacitor means across said input terminals, and
   - means for operating said switch means at a frequency $f$ whereby the bandwith of said filter subsequent to the initial charging approximates $C_1f_1/2\pi C_2$ cycles per second.

3. A dual mode filter comprising:
   - a pair of input terminals and a pair of output terminals,
   - first and second capacitor means having the capacitance values $C_1$ and $C_2$, respectively, where $C_2$ is greater than $C_1$,
   - circuit means connecting said second capacitor means between said output terminals, means for momentarily connecting said input terminals to said output terminals to charge said second capacitor means in response to the voltage across said input terminals,
   - switch means for connecting said first capacitor means between said input terminals or said output terminals, and
   - means for operating said switch means at a frequency $f$ subsequent to charging said second capacitor means across said input terminals whereby the bandwidth of said filter subsequent to the initial charging approximates $C_1f_1/2\pi C_2$ cycles per second.

References Cited by the Examiner

UNITED STATES PATENTS

| | | | |
|---|---|---|---|
| 2,685,676 | 8/1954 | Williams | 333—70 X |
| 3,059,220 | 10/1962 | Dimeff | 307—109 X |

MILTON O. HIRSHFIELD, *Primary Examiner.*

J. J. SWARTZ, *Assistant Examiner.*